United States Patent
Baughman

(10) Patent No.: US 8,719,191 B2
(45) Date of Patent: May 6, 2014

(54) TRAINING AND VERIFICATION USING A CORRELATED BOOSTED ENTITY MODEL

(75) Inventor: Aaron K. Baughman, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 12/714,976

(22) Filed: Mar. 1, 2010

(65) Prior Publication Data

US 2011/0213737 A1   Sep. 1, 2011

(51) Int. Cl.
   *G06F 15/18*  (2006.01)
(52) U.S. Cl.
   USPC .......................................................... 706/12
(58) Field of Classification Search
   USPC ..................................................... 706/12, 62
   See application file for complete search history.

(56) References Cited

U.S. PATENT DOCUMENTS

| | | |
|---|---|---|
| 6,697,778 B1 | 2/2004 | Kuhn et al. |
| 2004/0189441 A1 | 9/2004 | Stergiou |
| 2005/0111705 A1 | 5/2005 | Waupotitsch et al. |
| 2007/0183633 A1 | 8/2007 | Hoffmann |
| 2007/0214173 A1 | 9/2007 | Ohashi et al. |
| 2008/0175445 A1 | 7/2008 | Hu et al. |
| 2009/0018984 A1 | 1/2009 | Solinsky |
| 2009/0222308 A1 | 9/2009 | Zoldi et al. |

FOREIGN PATENT DOCUMENTS

CN   101482905   7/2009

OTHER PUBLICATIONS

Su et al, "Multiple Fisher Classifiers Combination for Face Recognition based on Grouping AdaBoosted Gabor Features", British Machine Vision Association Conference Paper, 2005.*

Jung et al, "Robust Identity Verification Based on Infrared Face Images", 2007 International Conference on Convergence Information Technology, Date of Conference: Nov. 21-23, 2007, pp. 2066-2071.*

Kuncheva et al, "An experimental study on diversity for bagging and boosting with linear classifiers", Information Fusion 3 (2002) 245-258.*

(Continued)

*Primary Examiner* — Jeffrey A Gaffin
*Assistant Examiner* — Ilya Traktovenko
(74) *Attorney, Agent, or Firm* — Douglas A. Lashmit; Hoffman Warnick LLC

(57) ABSTRACT

A system, method and program product training and verifying using an identity or entity model. A training system is disclosed that includes: a feature correlation system that groups features from an inputted feature data sample into subsets; a plurality of classifiers that determine if each feature classifies into an associated one of a plurality of feature models that make up the entity model; and a boosting system that boosts features from a subset for a next round of training if any of the features classify and at least one correlated feature from the subset does not classify. A verification system is disclosed that includes an identity model for the entity comprising a plurality of feature models, wherein each feature model is utilized to model a unique feature; a system for receiving a feature data sample and partitioning the feature data sample into a plurality of features; a system for determining if each of the plurality of features classifies into an associated feature model; and a voting system for analyzing a result of each attempted classification and determining an overall verification result.

15 Claims, 5 Drawing Sheets

(56) References Cited

OTHER PUBLICATIONS

Kong et al, "Multiscale Fusion of Visible and Thermal IR Images for Illumination-Invariant Face Recognition", International Journal of Computer Vision, Special Issue on Object Tracking and Classification Beyond the Visible Spectrum, vol. 71, No. 2, pp. 215-233, Feb. 2007.*

Sanderson et al, "Features for robust face-based identity verification", Signal Processing 83 (2003) 931-940.*

Olson et al, "A Performance Comparison of Neural Network and Statistical Pattern Recognition Approaches to Automatic Target Recognition of Ground Vehicles using SAR Imagery", Proc. SPIE 3161, Radar Processing, Technology, and Applications II, 159 (Sep. 24, 1997).*

Vizcaya et al., "A Nonlinear Orientation Model for Global Description of Fingerprints", Pattern Recognition, vol. 29, Issue 7, Jul. 1996.

\* cited by examiner

TRAINING AND VERIFICATION USING A CORRELATED BOOSTED ENTITY MODEL

FIELD OF THE INVENTION

This disclosure is related generally to verification, and more particularly to a system and method of training and verification using a correlated boosted entity model.

BACKGROUND OF THE INVENTION

With an entity instance, identity verification using verification search generally involves verifying an identity of an individual by collecting and comparing a biometric feature vector (e.g., fingerprint, facial features, etc.) against a template. The template is for example created during a feature extraction phase in which sample features are acquired from a base sample. If the collected biometric features match the template, then the individual is verified. In contrast to verification searching, identity based searching involves comparing collected sets of features to a database of templates to determine an identity of the individual.

Public and private entities, including the FBI, intelligence agencies, and the Department of Defense, are moving towards identity based concepts with respect to verification searches. For example, an investigator might have five high priority cases for which continual monitoring for specific matches is required. In this situation, the investigator would have to run a potentially large identification search on a gallery of data, which can be very time-consuming. One approach therefore is to run a one-to-one verification on a specific image or template. However, if the associated case has a large number of samples, e.g., pictures, the one-to-one verification based on one template might not be an accurate model.

SUMMARY OF THE INVENTION

The present invention relates to a system, method and program product for training an entity model and using the correlated boosted entity model for verification.

In one embodiment, there is a system for training an entity model, comprising: a feature correlation system that groups features from an inputted feature data sample into subsets; a plurality of classifiers that determine if each feature classifies into an associated one of a plurality of feature models that make up the entity model; and a boosting system that boosts features from a subset for a next round of training if any of the features classify and at least one correlated feature from the subset does not classify.

In a second embodiment, there is a system for verifying an identity of an entity, comprising: an identity model for the entity comprising a plurality of feature models, wherein each feature model is utilized to model a unique feature; a system for receiving a feature data sample and partitioning the feature data sample into a plurality of features; a system for determining if each of the plurality of features classifies into an associated feature model; and a system for analyzing a result of each attempted classification and determining an overall verification result.

In a third embodiment, there is a method for training an entity model, comprising: implementing a computer system to perform: grouping features from an inputted feature data sample into subsets; determining if each feature classifies into an associated one of a plurality of feature models that make up the entity model; and boosting features from a subset for a next round of training if any of the features classify and at least one correlated feature from the subset does not classify.

In a fourth embodiment, there is a computer readable storage medium having a program product stored thereon for training an entity model, comprising: program code for grouping features from an inputted feature data sample into subsets; program code for determining if each feature classifies into an associated one of a plurality of feature models that make up the entity model; and program code for boosting features from a subset for a next round of training if any of the features classify and at least one correlated feature from the subset does not classify.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
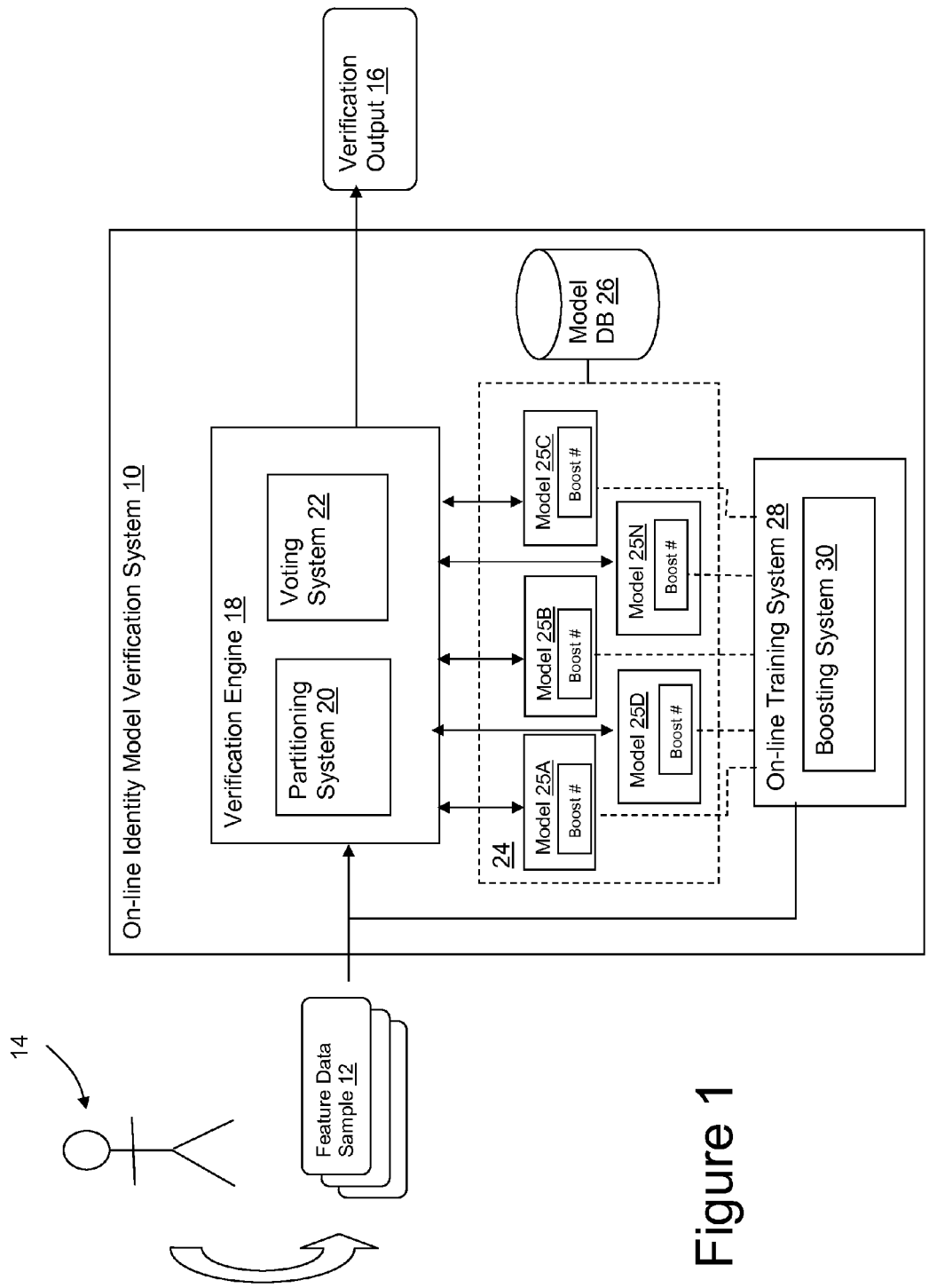
FIG. 1 depicts an on-line identity or entity verification search system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Described herein is a solution for creating and utilizing entity models. According to an illustrative embodiment, entity models are utilized to model or describe some type of entity by independently modeling different feature dimensions of the entity. Each entity model is formed from a subset of feature classes that model different aspects or dimensions of the entity. In an illustrative embodiment described herein, the entity model is implemented as an identity model for use in verifying an identity in which dimensions represent different features associated with, e.g., a person. However, it is understood that an entity model can be used for purposes beyond identity verification, e.g., social networking, marketing, etc.

In the case of an identity model for a person, any number of different modality classes or features, such as face, fingerprint, financial, voice, travel, social, biographic, health, etc., could be utilized. In addition, although generally described herein as verifying people, identity models could be utilized to verify just about anything, e.g., animals, buildings, cities, virtual entities, etc. For example, for a person, the identity model may include classes such as fingerprint, height, financial data, and travel data. In contrast, a fruit's classes could include weight, texture, color, mass, and odor. An animal's classes could include pulse, blood sugar, adrenaline, weight, breed, etc.

An "on-line" verification system is utilized to verify an identity of an entity by analyzing one or more features obtained from the entity against an identity model constructed ahead of time for the entity. The identity model is constructed in an off-line training mode, e.g., utilizing a neural network. The identity model can be further refined, e.g., trained, during on-line operations.

FIG. 1 shows an on-line identity model verification system 10 that analyzes a feature data sample 12 obtained from an entity, such as individual 14, and generates a verification output 16, e.g., yes/no. Feature data sample 12 comprises a set of different features or classes of data, e.g., fingerprint, retinal data, financial data, etc. Any number or type of features may be utilized to make up the feature data sample 12.

In order to verify individual 14, feature data sample 12 is inputted into a verification engine 18, which obtains an identity model 24 from a model database 26 for the individual 14 being verified. Each identity model 24 is unique to a different individual and includes a set of feature models (Model 25A, Model 25B . . . Model 25N) for different classes of data. For example, Model 25A may provide a fingerprint model, Model 25B may provide a retinal model, Model 25C may provide a financial model, etc.

Partitioning system 20 partitions or scales feature data sample 12 into its different classes. Data obtained for each class are then analyzed against an associated feature model to ascertain whether or not the data classifies correctly. For example, a fingerprint would be classified against a fingerprint model, facial image data would be classified against a face model, etc. Each classification test may yield a simple binary result (yes/no), or some other value (e.g., a percent, a likelihood of a match, etc.). The results from each analysis are then provided to a voting system 22, which utilizes a predetermined heuristic (e.g., majority rules, average, all or nothing, etc.) to generate a verification output 16. For example, five of six of the inputted features from the feature data sample 12 may classify as "yes" and one may classify as "no". A "majority rule" voting scheme would result in individual 14 being verified since a majority of the classifiers returned a "yes". An "all or nothing" voting scheme would result in the individual 14 not being verified since there was at least one "no". Obviously, other heuristics could be utilized and the particular voting heuristic can thus be set to a desired level of security for the particular application.

In addition, on-line identity model verification system 10 may include an on-line training system 28 that applies the feature data sample 12 to the associated feature models within the identity model 24. For example, a new fingerprint sample could be added to the fingerprint model to further train the model. In cases where the quality of a new sample can be ascertained, e.g., based on metadata, the sample can be boosted within its class using boosting system 30 to reflect its relative efficacy. Boosting, which is described in more detail below with regard to off-line training, may for example include cloning the exemplar multiple (#) times within the model. For instance, it may be known that a fingerprint sample is of a high quality. Accordingly, that exemplar may be cloned and used multiple times to train the fingerprint model.

Figure 2:
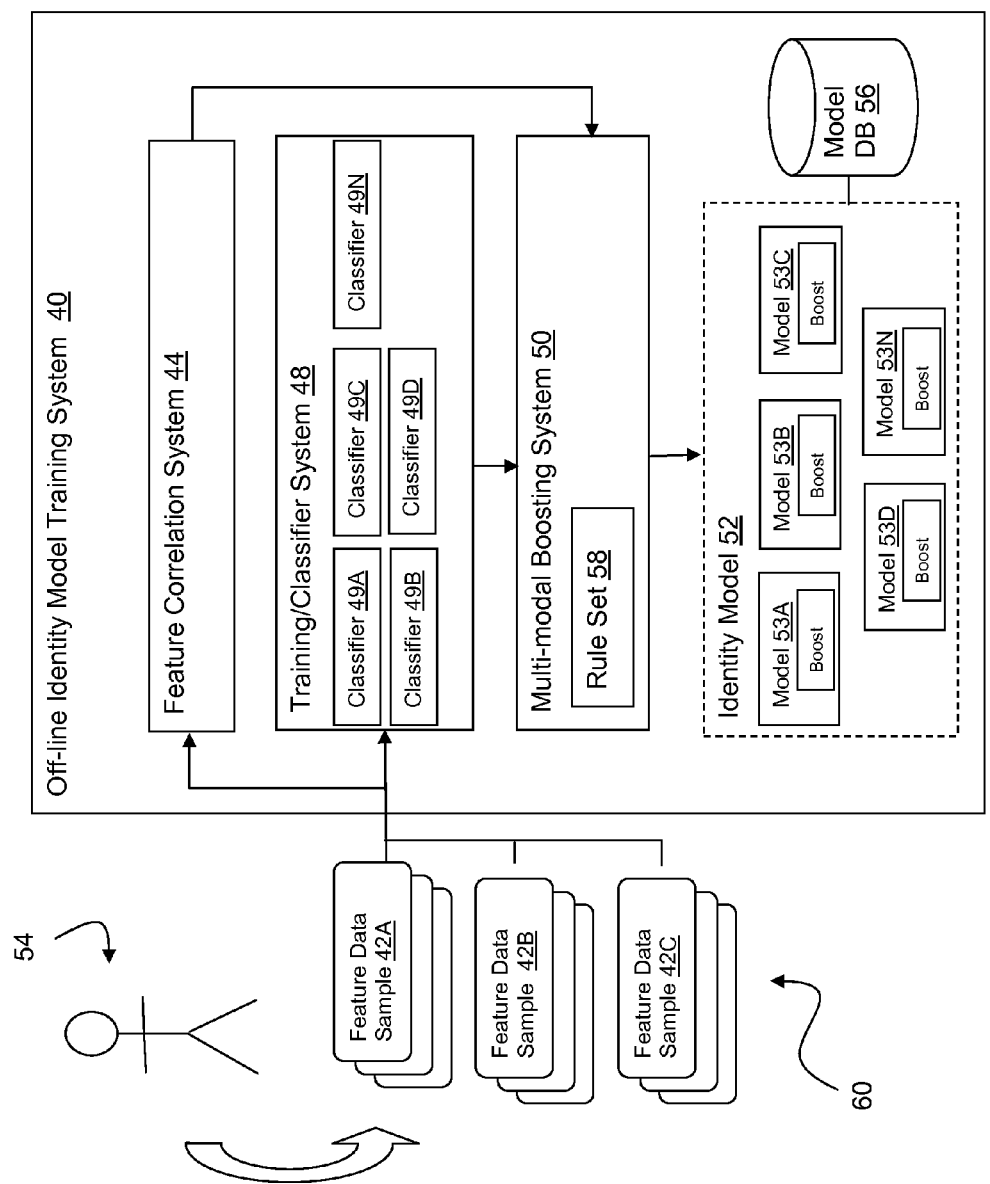
FIG. 2 depicts an off-line identity or entity model training system in accordance with an embodiment of the present invention.

FIG. 2 depicts an off-line identity model training system 40 for creating and training an identity model 52 for later use in verifying an entity 54, such as that shown in FIG. 1. As can be seen, identity model 52 is composed of a set of feature models (Model 53A, Model 53B . . . Model 53N), which, once trained, can be deployed for on-line verification. Training is accomplished by reading in feature data samples 42A, 42B, 42C (i.e., training datasets 60) for the entity 54 and incorporating those features into the feature models within the identity model 52 of the associated entity 54. Identity models 52 for different entities may be stored in a model database 56.

Training is further enhanced by exploiting the fact that each training dataset 60 is multi-modal, i.e., contains multiple classes or dimensions for a given feature data sample, e.g., feature data sample 42A. Enhanced training is implemented as follows. Once obtained, a given feature data sample 42A is passed into the feature correlation system 44, which finds exclusive groupings of features within the feature data sample 42A that have either the most characteristics in common or the least characteristics in common. Grouping criteria are generally determined a priori. For example, it may be known that financial data and travel data are commonly linked, or that a first health condition is common to a second health condition. The groupings of data become correlated features.

Figure 3:
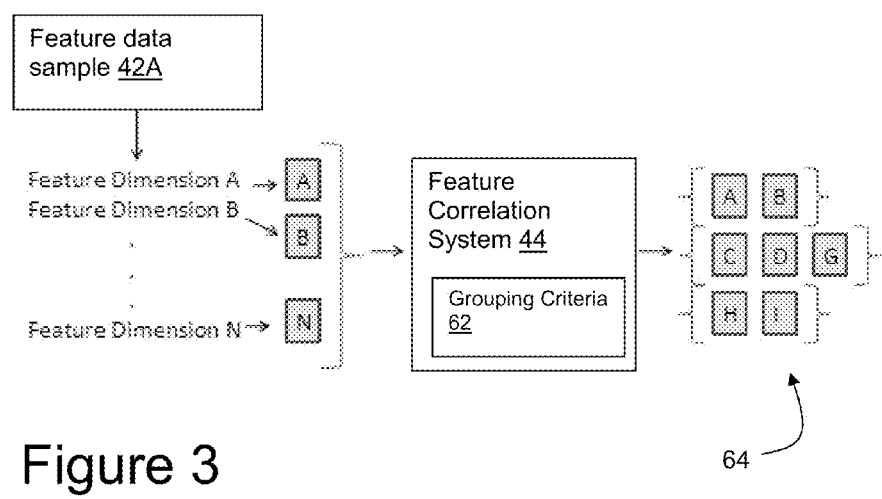
FIG. 3 depicts a feature correlation system in accordance with an embodiment of the invention.

FIG. 3 depicts an example of how feature correlation system 44 works. In this example, a feature data sample 42A is broken down into its constituent features or dimensions A, B . . . N. Feature correlation system 44 groups different dimensions into subsets 64 based on predetermined grouping criteria 62. In this case, features A and B are grouped into a first subset, features C, D and G are grouped into a second subset, and features H and I are grouped into a third subset. Grouping criteria 62 may be determined in any manner, e.g., using metadata incorporated into samples, based on ongoing learning patterns, etc.

Referring again to FIG. 2, a training/classifier system 48 having a bank of classifiers (Classifier 49A, Classifier 49B . . . ) is used to train the multimodal features from inputted feature data sample 42A. During training, each feature is marked if the feature classified correctly. For instance, a fingerprint (e.g., feature C) may be inputted and compared to the associated feature model (e.g., Model C). If the fingerprint appears to fit the model (i.e., belongs to the class), it classifies as a yes. If it does not appear to fit the model, it classifies as a no.

If one or more of the features for a given feature data sample 42A does not classify correctly, multimodal boosting system 50 is utilized to boost other members of the feature's subset. For example, referring to both FIGS. 2 and 3, if feature C did not classify correctly and features D and G do classify correctly, multimodal boosting system 50 will boost features D and G for the next round of training. For example, features D and G will be cloned some number of times for incorporation into their associated feature models. The amount of boosting is dictated by a rule set 58, which can use any scheme to determine how much boosting is to occur. In general, training will continue until each of the sum of the classifier errors is below an empirically determined value that avoids over-fitting and over-training.

Figure 4:
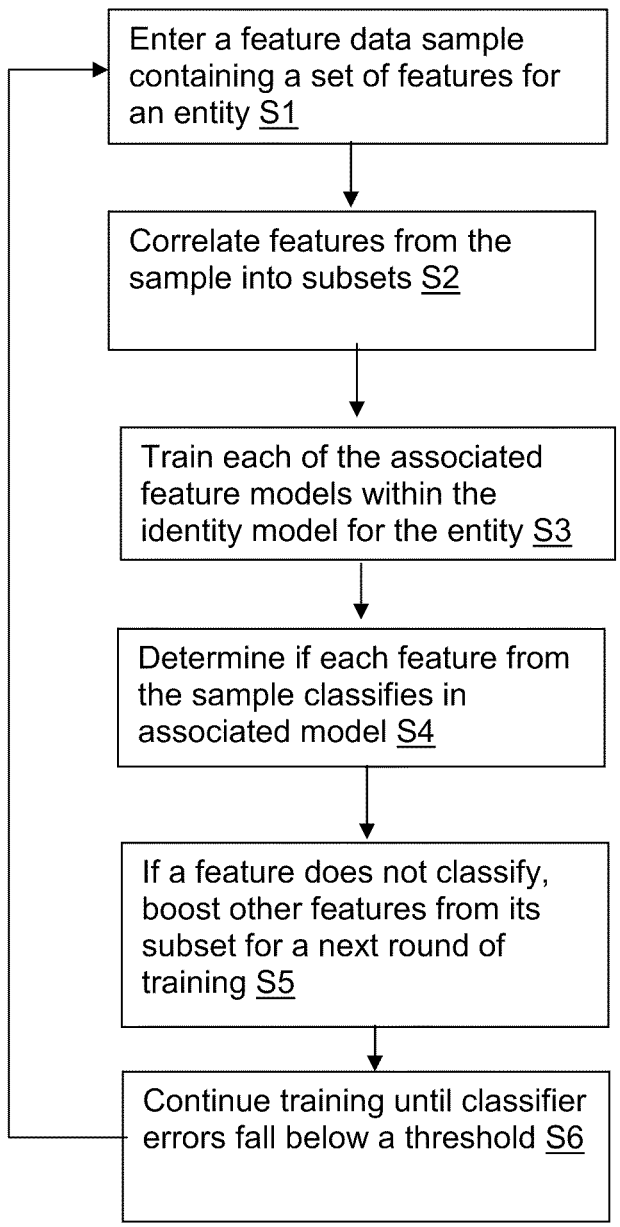
FIG. 4 depicts a flow diagram showing an identity or entity model training method in accordance with an embodiment of the invention.

FIG. 4 depicts a flow diagram showing a method of training an identity model having a set of feature models. At S1, a feature data sample containing a set of features is entered into a training system. At S2, features from the sample are correlated into subsets. At S3, associated feature models are trained for the entity based on the inputted features in the feature data sample. At S4, a determination is made whether each feature classifies into is associated feature model. At S5, if a feature does not classify, other features are boosted from its subset for a next round of training. At S6, the training is repeated until the classifier error fall below some predetermine threshold.

Figure 5:
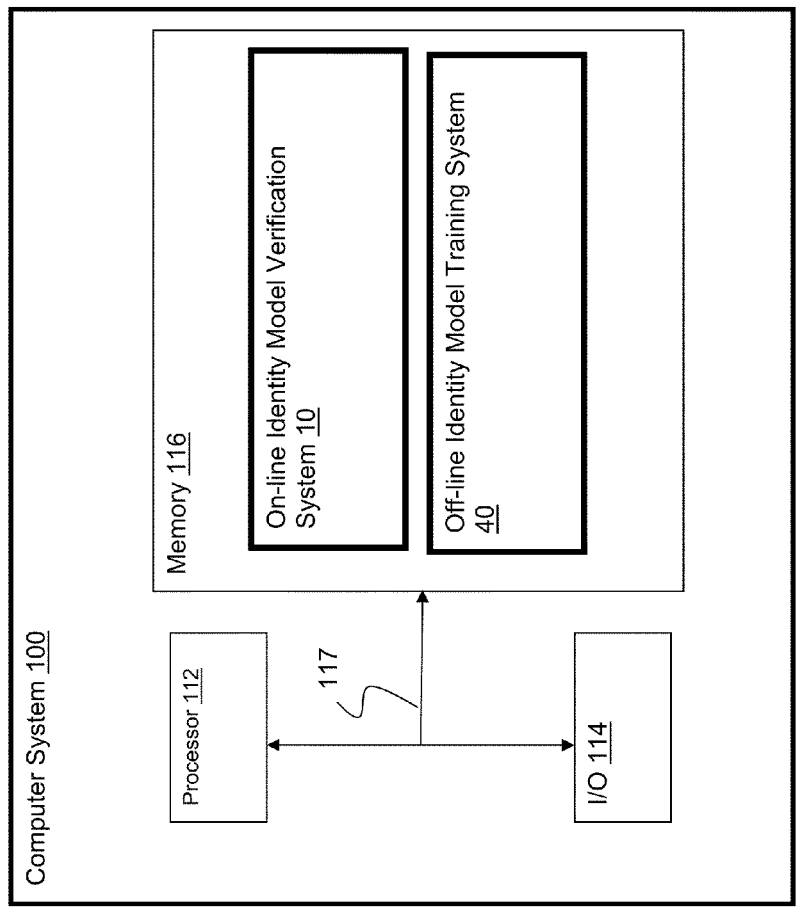
FIG. 5 depicts a computer system in accordance with an embodiment of the invention.

Referring to FIG. 5, it is understood that the on-line identity model verification system 20 as well as the off-line identity model training system 40 may be implemented using one or more computing devices (e.g., computer system 100). Such a computing device generally includes a processor 112, input/output (I/O) 114, memory 116, and bus 117. The processor 112 may comprise a single processing unit, or be distributed across one or more processing units in one or more locations, e.g., on a client and server. Memory 116 may comprise any known type of data storage, including magnetic media, optical media, random access memory (RAM), read-only memory (ROM), a data cache, a data object, etc. Moreover, memory 116 may reside at a single physical location, comprising one or more types of data storage, or be distributed across a plurality of physical systems in various forms.

I/O 114 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus 117 provides a communication link between each of the components in the computing device and likewise may comprise any known type of transmission link, including electrical, optical, wireless, etc. Although not shown, additional components, such as cache memory, communication systems, system software, etc., may be incorporated.

Access may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising an on-line identity model verification system 10 and/or an off-line identity model training system 40 could be created, maintained and/or deployed by a service provider that offers the functions described herein for customers. That is, a service provider could offer to deploy or provide the ability to verify and/or train as described above.

It is understood that in addition to being implemented as a system and method, the features may be provided as one or more program products stored on a computer-readable storage medium, which when run, enables a computer system to provide off-line training and on-line verification using identity models. To this extent, the computer-readable storage medium may include program code, which implements the processes and systems described herein. It is understood that the term "computer-readable storage medium" comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component", "subsystem" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for training an entity model, comprising:
at least one computer device including:
a feature correlation system that groups features from an inputted feature data sample into subsets based on which features have the most characteristics in common, the grouping being determined by the at least one computer device;
a plurality of classifiers that determine if each feature classifies into an associated one of a plurality of feature models that make up the entity model; and
a boosting system that boosts features from a subset for a next round of training if any of the features classify and at least one correlated feature from the subset does not classify, wherein for each of the features that classify, a plurality of clones of the feature are generated for multiple future uses.

2. The system of claim 1, wherein each feature model is implemented using a model representation.

3. The system of claim 1, wherein each of the plurality of feature models is utilized to model a unique class.

4. The system of claim 1, wherein the entity model comprises an identity model used for verification.

5. A system for verifying an identity of an entity, comprising:
- at least one computer device including:
- an identity model for the entity comprising a plurality of feature models, wherein each feature model is utilized to model a unique feature;
- a system for receiving a feature data sample and partitioning the feature data sample into a plurality of features based on which features have the most characteristics in common, the grouping being determined by the at least one computer device;
- a system for determining if each of the plurality of features classifies into an associated feature model;
- an on-line training system that trains feature models within the identity model based on inputted features, the online training system including a boosting system for boosting inputted features, wherein for each of the inputted features that classify, a plurality of clones of the feature are generated for multiple future uses; and
- a system for analyzing a result of each attempted classification and determining an overall verification result.

6. The system of claim 5, wherein the identity model is stored in model database.

7. The system of claim 5, wherein the identity model is implemented with a representation model.

8. A method for training an entity model, comprising:
implementing a computer system to perform:
- grouping features from an inputted feature data sample into subsets based on which features have the most characteristics in common, the grouping being determined by the computer system;
- determining if each feature classifies into an associated one of a plurality of feature models that make up the entity model; and
- boosting features from a subset for a next round of training if any of the features classify and at least one correlated feature from the subset does not classify, wherein for each of the features that classify, a plurality of clones of the feature are generated for multiple future uses.

9. The method of claim 8, wherein each feature model is implemented using a model representation.

10. The method of claim 8, wherein each of the plurality of feature models is utilized to model a unique class.

11. The method of claim 8, wherein the entity model comprises an identity model used for verification.

12. A non-transitory computer readable medium having a program product stored thereon for training an entity model, comprising:
- program code for grouping features from an inputted feature data sample into subsets based on which features have the most characteristics in common, the grouping being determined by at least one computer device;
- program code for determining if each feature classifies into an associated one of a plurality of feature models that make up the entity model; and
- program code for boosting features from a subset for a next round of training if any of the features classify and at least one correlated feature from the subset does not classify, wherein for each of the features that classify, a plurality of clones of the feature are generated for multiple future uses.

13. The non-transitory computer readable medium of claim 12, wherein each feature model is implemented using a model representation.

14. The non-transitory computer readable medium of claim 12, wherein each of the plurality of feature models is utilized to model a unique class.

15. The non-transitory computer readable medium of claim 12, wherein the entity model comprises an identity model used for verification.

* * * * *